United States Patent [19]
Horn et al.

[11] Patent Number: 5,334,448
[45] Date of Patent: Aug. 2, 1994

[54] POLYVINYL CHLORIDE/POLYURETHANE FOAM COMPOSITE ELEMENTS, THE PRODUCTIONS THEREOF, AND LIQUID, URETHANE-CONTAINING POLYISOCYANATE MIXTURES WHICH CAN BE USED TO PREPARE THE POLYURETHANE FOAM

[75] Inventors: Peter Horn, Heidelberg; Erhard Reich, Damme; Stefan Adams, Ludwigshafen; Sarbananda Chakrabarti, Mannheim, all of Fed. Rep. of Germany

[73] Assignee: BASF Aktiengesellschaft, Ludwigshafen, Fed. Rep. of Germany

[21] Appl. No.: 802,074

[22] Filed: Dec. 3, 1991

[30] Foreign Application Priority Data

Dec. 5, 1990 [DE] Fed. Rep. of Germany ....... 4038783

[51] Int. Cl.$^5$ .............................................. B32B 27/00
[52] U.S. Cl. ................................ 428/319.7; 428/319.3
[58] Field of Search ........................... 428/319.7, 319.3

[56] References Cited

U.S. PATENT DOCUMENTS

| | | | |
|---|---|---|---|
| 3,966,521 | 6/1976 | Patton, Jr. et al. | 156/78 |
| 4,069,517 | 1/1978 | Graham | 623/2 |

Primary Examiner—George F. Lesmes
Assistant Examiner—Chris Raimund
Attorney, Agent, or Firm—Dennis V. Carmen

[57] ABSTRACT

A composite element which comprises
A) at least one top layer of polyvinyl chloride or a polyvinyl chloride-containing polymer mixture, and
B) a preferably semirigid or rigid polyurethane foam, the top layer (A) or the polyurethane foam (B) or the two constituents (A) and (B) containing units of an α,β-olefinically unsaturated polyester having a molecular weight factor per double bond of from 150 to 3000, a process for the production of composite elements of this type, and liquid, urethane-containing polyisocyanate mixtures based on diphenylmethane diisocyanates and higher homologs thereof and α,β-olefinically unsaturated polyesters for the preparation of the polyurethane foam (B) are described.

8 Claims, No Drawings

POLYVINYL CHLORIDE/POLYURETHANE FOAM COMPOSITE ELEMENTS, THE PRODUCTIONS THEREOF, AND LIQUID, URETHANE-CONTAINING POLYISOCYANATE MIXTURES WHICH CAN BE USED TO PREPARE THE POLYURETHANE FOAM

The present invention relates to composite elements which comprise

A) at least one top layer of polyvinyl chloride or a polyvinyl chloride-containing polymer mixture, and B) a polyurethane foam, preferably a semirigid or rigid polyurethane foam, where at least one of the constituents (A) or (B) contains units of an $\alpha,\beta$-olefinically unsaturated polyester having a molecular weight factor per double bond of from 150 to 3000, to a process for the production of composite elements of this type, and to liquid, urethane-containing polyisocyanate mixtures for the preparation of the polyurethane foam (B).

Composite elements which comprise a top layer, for example a plastic film, of polyvinyl chloride or a polyvinyl chloride-containing polymer mixture, for example ABS/PVC, and have been provided with a foam backing of a polyurethane foam (also abbreviated to PU foam below), for example a soft-elastic or semirigid PU foam, using a mold have been known for some time and are described, for example, in Kunststoff-Handbuch, Polyurethane, Volume 7, 2nd Edition, 1983, published by Dr. G. Oertel (pages 235 ff., Carl Hanser Verlag, Munich, Vienna).

Composite elements of this type have considerable industrial importance, in particular in the automotive industry, and are used, for example, as seat cushions, backrests, neck- and armrests, sun visors, fascia panels, dashboards, door side paneling, inter alia.

Suitable top layers can be produced by known processes. For example, polyvinyl chloride (PVC) films can be obtained by the powder slush process. In this, the mold is heated to approximately 250° C. in an oven, the pulverulent PVC is then distributed uniformly thereon, and the mold is re-heated in the oven to gel the PVC film. After the mold has been cooled, for example in a water bath, the film can be removed and provided with a foam backing. In another procedure, slush molding, an electroplating mold is filled to capacity with a PVC plastisol comprising about 55% by weight of PVC, 35% by weight of plasticizer and assistants and, if desired, a pigment paste. During the mold heating phase, the PVC plastisol is pre-gelled at the walls. The excess is removed, and the gelling is completed at from 280° to 350° C.

PVC/ABS and PVC/ABS/polyvinyl acetate polymer mixtures for the production of large-area top layers, for example for dashboards or door side paneling, consoles, inter alia, are processed almost exclusively by vacuum forming. The films comprising polymer mixtures are preheated using IR lamps and are vacuum formed via thermoforming molds, for example made from epoxy resins or aluminum.

The composite elements are produced using top layers, preferably films, having a thickness, varying depending on the production process, of from approximately 0.5 to 3 mm, preferably from 0.8 to 1.5 mm.

Composite elements provided with PVC or polyvinyl chloride-containing polymers as the top layer have significant disadvantages. As is known, PVC begins to decompose markedly from only 100° C. on heating alone or in combination with UV light, with elimination of hydrogen chloride. This decomposition is accelerated autocatalytically by the PU foam, which contains bonded urea and urethane groups (Vysokomol. soyed. A 30, No. 4 (1988), pages 829–833). In order to obtain void-free PU moldings, certain amine catalysts are frequently employed to provide a balance between a controlled polyaddition reaction and a blowing reaction; these also contribute to the degradation of the PVC. Thus, constituents, for example catalysts, stabilizers, inter alia, diffuse out of the PU foam into the top layer, and conversely plasticizers migrate from the polyvinyl chloride-containing top layer into the PU foam. These migration processes mechanically damage the moldings, for example due to shrinkage or embrittlement, and modify their appearance due to discoloration and spotting (Kunststofftechnik, VDI-Verlag GmbH, Dusseldorf, 1987, Kunststoffe als Problemlöser im Automobilbau, pages 141 ff.).

There has therefore been no lack of attempts to reduce the decomposition of PVC-containing top layers. According to EP-A-0 210 440 and DE-A-27 32 292 (U.S. Pat. No. 4,248,930), a suitable measure for this purpose has proven to be the use of tertiary amine-based catalysts which can be incorporated into the urethane skeleton. However, re-cleavage of the urethane groups on heating and thus the elimination of tertiary amines cannot be completely prevented.

It also proved to be an advance to use metal catalysts as in DD-A-113 766 for the preparation of the PU foam.

Since automobile windscreens have become more inclined in order to reduce air resistance (the angles are now usually about 70°), temperatures inside the vehicle, for example on the dashboard, of from 120° C. to 130° C. are reached in summer, in particular in slow-moving traffic. As stated above, these high temperatures result in considerable embrittlement, or even fracture, and discoloration of the outer layers. Since outer layers with a wide variety of color shades are increasingly being employed in automobile manufacture and since discoloration of the outer layer is in numerous cases also associated with discoloration of the PU foam, which is evident from an impairment in the mechanical properties, the mechanical demands made of composite elements of this type have increased considerably. Thus, PVC/ABS films are currently required to have residual elongation values of 100% absolute after storage in a circulation drying oven at from 120° to 130° C. for 500 hours. A sun simulation test is also frequently carried out. Said demands can only be met very unsatisfactorily, or not at all, by means of the known composite elements.

Also known from numerous patent and other publications is the preparation of PU foams and the preparation of NCO-containing prepolymers. According to U.S. Pat. No. 4,182,898, for example, mixtures of polyester-polyols and polyoxyalkylene-polyols are reacted with polyisocyanates in an NCO/OH ratio of from 1.5:1 to 2:1 to give NCO prepolymers. By contrast, U.S. Pat. No. 4,647,596 describes the preparation of NCO-containing prepolymers having an NCO content of less than 5 from polyester-polyether-polyols, for example copolymers of polytetramethylene glycol and $\epsilon$-caprolactone, and diphenylmethane diisocyanate (MDI).

According to EP-A-239 704, PU foams are prepared using urethane-containing polyisocyanate mixtures having an NCO content of from 15 to 32% by weight which are prepared by reacting a polyester-polyol with a mixture of from 45 to 95% by weight of MDI and from 55 to 5% by weight of a polyphenyl-polymethylene polyisocyanate (PMDI) having a functionality of 3 or more. EP-A-0 358 328 likewise describes isocyanate mixtures which contain from 10 to 90% by weight of a polyester-polyol-based NCO prepolymer having a functionality of from 2.0 to 2.3, and from 90 to 10% by weight of a polyoxyalkylene-polyol-based NCO prepolymer having a functionality of from 2.0 to 2.3 and having an ethylene oxide content of from 3 to 50% by weight. Furthermore, DD 237 758 describes the preparation of NCO prepolymers by reacting 4,4'-MDI with various polyoxyalkylene-polyols and, if desired, polyester-polyols. Likewise known is the preparation of polyester-urethane foams by reacting polyester-polyols with polyisocyanates in the presence of water. The swelling capacity of polyester-urethane foams of this type is increased, according to DE-B-1 086 883 (U.S. Pat. No. 2,990,378), using polyester-polyols prepared using $\alpha,\beta$-unsaturated aliphatic dicarboxylic acids.

It is an object of the present invention to provide composite elements made from PVC-containing top layers and PU foams and having improved mechanical properties, i.e. the known drawbacks of composite elements should be overcome as fully as possible, or at least partly.

We have found that, surprisingly, this object is achieved by adding an $\alpha,\beta$-olefinically unsaturated polyester to the PVC, to the polyvinyl chloride-containing polymer mixture or to the PU foam.

The present invention accordingly provides a composite element which comprises
A) at least one top layer of polyvinyl chloride or a polyvinyl chloride-containing polymer mixture, and
B) a polyurethane foam, preferably a semirigid or rigid polyurethane foam,
wherein the polyvinyl chloride or polyvinyl chloride-containing polymer mixture of the top layer (A), the polyurethane foam (B) or the top layer (A) and the polyurethane foam (B) contain units of an $\alpha,\beta$-olefinically unsaturated polyester having a molecular weight factor per double bond of from 150 to 3000, preferably of from 160 to 800.

According to a preferred embodiment, the $\alpha,\beta$-olefinically unsaturated polyester having the above-mentioned molecular weight factor per double bond is bonded into the urethane skeleton of the foam and therefore expediently has
a functionality of from 2 to 6, preferably from 2 to 4, in particular from 2 to 3,
a hydroxyl number of from 20 to 800, preferably from 80 to 700, in particular from 180 to 400, and
an acid number of from 0 to 15, preferably from 0 to 4, in particular from 0 to 1.

The present invention furthermore provides a process for the production of a composite element comprising
A) at least one top layer of polyvinyl chloride or a polyvinyl chloride-containing polymer mixture, and
B) a polyurethane foam,
which comprises laying the top layer or the $\alpha,\beta$-olefinically unsaturated polyester-containing top layer (A) into a mold in such a manner that its inner surface is partially or fully covered,
then introducing the reaction mixture which may contain at least one $\alpha,\beta$-olefinically unsaturated polyester in bonded form, into the mold in order to form the polyurethane foam, and allowing the mixture to foam and cure therein,
with the proviso that at least one of the constituents (A) and (B) of the composite element contains an $\alpha,\beta$-unsaturated polyester having a molecular weight factor per double bond of from 150 to 3000.

The present invention furthermore provides a liquid, urethane-containing, diphenylmethane diisocyanate-based polyisocyanate mixture containing from 15 to 32% by weight of isocyanate groups which is highly suitable for the preparation of the PU foam and is obtained by reacting
a mixture of a diphenylmethane diisocyanate and a polyphenyl-polymethylene polyisocyanate with
at least one $\alpha,\beta$-olefinically unsaturated polyester having a molecular weight factor per double bond of from 150 to 3000, a functionality of from 2 to 6, a hydroxyl number of from 20 to 800 and an acid number of from 0 to 15, or
a mixture of at least one of said $\alpha,\beta$-olefinically unsaturated polyesters and at least one polyoxyalkylene-polyol having a functionality of from 2 to 4 and a hydroxyl number of from 20 to 400, or
by reacting 4,4'-diphenylmethane diisocyanate or a mixture of diphenylmethane diisocyanate isomers, preferably a mixture of 4,4'- and 2,4'-diphenylmethane diisocyanates, with at least one of said $\alpha,\beta$-olefinically unsaturated polyesters, or
a mixture of at least one of said $\alpha,\beta$-olefinically unsaturated polyesters and at least one polyoxyalkylene-polyol having a functionality of from 2 to 4 and a hydroxyl number of from 20 to 400, and
subsequently diluting the urethane-containing reaction product obtained with a mixture of diphenylmethane diisocyanate and polyphenyl-polymethylene polyisocyanate.

Composite elements having very good mechanical properties are obtained, in particular, if the $\alpha,\beta$-olefinically unsaturated polyester is included in the top layer (A) and bonded in the PU foam (B). For technical reasons associated with processing and in order to increase the shelf life of the polyurethane formulations, it has proven advantageous to modify the polyisocyanate with the $\alpha,\beta$-olefinically unsaturated polyester and to convert the resultant, liquid, urethane-containing polyisocyanate mixture with a very long shelf life into a PU foam in a conventional manner. Surprisingly, PU foams prepared in this way have significantly improved residual elongation after storage at elevated temperature. Even storage at 120° C. for 500 hours causes only extremely slight discoloration of the PU foam. The measure according to the invention also significantly reduces discoloration of the PVC-containing top layer(s).

The addition of the $\alpha,\beta$-olefinically unsaturated polyester furthermore causes an extraordinary improvement in the adhesion between the PVC-containing top layer and the PU foam, so that there is no need to add adhesion promoters or adhesives to produce the composite element.

It is furthermore advantageous that the PU foams which are suitable according to the invention can be prepared using metal catalysts, so that PU foams which are entirely free from amine are formed.

The composite element according to the invention and the top layer or PU foam for its production contain, as stated above, an α,β-olefinically unsaturated polyester having the abovementioned characteristic data. Suitable unsaturated polyesters may be solid at 23° C. and have an amorphous, partially crystalline or crystalline structure. Unsaturated polyesters of this type which are solid at 23° C. are expediently used to modify the top layer (A) of PVC or a polyvinyl chloride-containing polymer mixture. However, α,β-olefinically unsaturated polyesters which are liquid at 23° C. are preferably used as components for building up the PU foam. Since the α,β-olefinically unsaturated polyesters are usually not sufficiently miscible with relatively high-molecular-weight polyhydroxyl compounds, in particular polyoxyalkylene-polyols, so that formation of processible, homogeneous mixtures requires the addition of suitable emulsifiers, and the mixtures only have an inadequate shelf life, i.e. the rise time and setting time of the PU foam change with increasing storage time, the α,β-olefinically unsaturated polyester is used, in particular, to modify the organic polyisocyanate.

The following applies to the components suitable for building up the composite element according to the invention and to the starting materials for the preparation of the modified, urethane-containing polyisocyanate based on MDI, PMDI or crude MDI, and the PU foam:

Suitable α,β-olefinically unsaturated polyesters having a molecular weight factor per double bond of from 150 to 3000 are the known products of the polycondensation of polybasic, preferably dibasic, carboxylic acids and esterifiable derivatives thereof which are linked in an ester-like manner to polyhydric, preferably dihydric, alcohols and may contain radicals of monobasic carboxylic acids or monohydric alcohols or radicals of hydroxy-carboxylic acids, where at least some of the radicals must be available via ethylenically unsaturated groups.

Suitable carboxylic acids are preferably olefinically unsaturated dicarboxylic acids, in particular those having 4 or 5 carbon atoms, and the monoesters and/or diesters thereof with low-molecular-weight alcohols, or the anhydrides thereof. Specific examples are maleic acid, fumaric acid, itaconic acid, citraconic acid, methyleneglutaric acid and mesaconic acid, and the corresponding esters and anhydrides, preferably maleic acid, maleic anhydride and fumaric acid. Furthermore, the olefinically unsaturated polyesters may additionally contain, in condensed form, other unsaturated or saturated, aliphatic, aromatic or heterocyclic dicarboxylic acids with a modifying action, for example succinic acid, glutaric acid, methylglutaric acid, adipic acid, sebacic acid, pimelic acid, o-phthalic acid, isophthalic acid, terephthalic acid, dihydrophthalic acid, tetrahydrophthalic acid, methylated tetrahydrophthalic acid, 3,6-endomethylene-1,2,3,6-tetrahydrophthalic acid, endomethylenetetrachlorophthalic acid or hexachloroendomethylenetetrahydrophthalic acid. Furthermore, the modification may be effected using monocarboxylic acids, for example ethylhexanoic acid, fatty acids, acetic acid, propionic acid or benzoic acid, or tribasic or polybasic carboxylic acids, for example 1,2,4-benzenetricarboxylic acid or 1,2,4,5-benzenetetracarboxylic acid.

Suitable polyhydric alcohols are conventional alkanediols, preferably having from 2 to 8 carbon atoms, alkenediols and oxalkanediols. Specific examples are ethanediol, 1,3- and 1,2-propanediol, 1,4- and 1,3-butanediol, 1,6-hexanediol, 2,2-dimethyl-1,3-propanediol, 1,2-cyclohexanediol, 2,2-bis(p-hydroxycyclohexyl)propane, 1,4-bismethylolcyclohexane, vinyl glycol, trimethylolpropane monoallyl ether, 1,4-butenediol, diethylene glycol, triethylene glycol, polyoxyethylene glycol, dipropylene glycol, tripropylene glycol and polyoxpropylene glycol. It is also possible to use minor amounts of monohydric, trihydric or polyhydric alcohols, for example ethylhexanol, fatty alcohols, benzyl alcohol, 1,2-di(allyloxy)-3-propanol, glycerol, pentaerythritol or trimethylolpropane. The polyhydric alcohols are generally reacted in stoichiometric amounts with the polybasic, in particular dibasic, carboxylic acids or condensable derivatives thereof. These unsaturated polyesters are generally prepared from their starting components by melt condensation or condensation under azeotropic conditions at from 140° to 260° C., preferably at from 160° to 240° C., by a batchwise or continuous process, in the presence or absence of esterification catalysts. With respect to the composition of the α,β-olefinically unsaturated polyesters, reference is furthermore made, for example, to the monograph by H. V. Bönig, Unsaturated Polyesters, Structure and Properties, Amsterdam, 1964.

As stated above, at least difunctional α,β-olefinically unsaturated polyesters are used for binding into the PU foam, while relatively high-molecular-weight α,β-olefinically unsaturated polyesters which have inactive end groups and simultaneously function as plasticizers are preferably used to modify the PVC or the polyvinyl chloride-containing polymer mixtures as the top layer (A). The use of unsaturated polyesters with a plasticizing action in the top layer and the incorporation of the α,β-olefinically unsaturated polyesters into the PU foam additionally supplements their advantageous action in the composite element, in particular the adhesion.

In order to stabilize the α,β-olefinically unsaturated polyesters which can be used according to the invention and thus to suppress undesired polymerization (gelling), it has proven expedient to add polymerization inhibitors and/or antioxidants to these polyesters as early as their preparation. Stabilizers of this type are described, for example, in Methoden der Organischen Chemie, Houben-Weyl, Georg Thieme Verlag, Stuttgart, 1961. An example of a highly suitable stabilizer is hydroquinone, which is usually employed in a concentration of from 50 to 200 ppm, based on the weight of the α,β-olefinically unsaturated polyester.

The top layers (A) for the production of the composite element comprise PVC or a polyvinyl chloride-containing polymer, for example PVC/ABS, PVC/PUR, PVC/ABS/polyvinyl acetate, vinyl chloride/methacrylate/butadiene/styrene copolymer or ethylene/vinyl acetate/vinyl chloride graft copolymer. PVC and PVC/ABS films have proven particularly successful as top layers (A) and are therefore preferred.

If the composite element is produced using a top layer which has been modified using an α,β-olefinically unsaturated polyester which can be used according to the invention, the latter, which is preferably in paste form or in a form which softens at above 30° C., is usually incorporated in an amount of from 1 to 30% by weight, preferably from 5 to 20% by weight, in particular from 3 to 15% by weight, based on the weight of the top layer (A), into the PVC or polyvinyl chloride-containing polymer mixture to give a homogeneous mixture, for example using an extruder, expediently during production of the top layer, preferably the film.

According to a preferred embodiment, however, the PU foam, which is preferably rigid or, in particular, semirigid, is modified with the α,β-olefinically unsaturated polyester in an amount of from 1 to 30% by weight, preferably from 3 to 15% by weight, in particular from 4 to 10% by weight. The α,β-olefinically unsaturated polyesters preferably used for this purpose are liquid at 23° C., contain bonded hydrogen atoms which are reactive with NCO groups and are bonded in the PU foam via these hydrogen atoms.

Since the α,β-olefinically unsaturated polyesters are usually only sparingly miscible with polyoxyalkylene-polyols, it has proven expedient to partially react the organic polyisocyanate with the suitable olefinically unsaturated polyester and to use the resultant urethane-modified polyisocyanate mixture which is liquid at room temperature to prepare the PU foam for the composite element.

a) Urethane-containing polyisocyanate mixtures which are particularly successful for the preparation of the PU foam, and are therefore preferably used, are those which are liquid, are based on MDI and contain from 15 to 32% by weight, preferably from 22 to 31% by weight, in particular from 25 to 29% by weight, based on the total weight, of isocyanate groups and are obtainable by reacting a mixture comprising MDI isomers and polyphenyl-polymethylene polyisocyanates (PMDI), so-called crude MDI, with an α,β-olefinically unsaturated polyester having a molecular weight factor per double bond of from 150 to 3000, preferably from 160 to 800, a functionality of from 2 to 6, preferably from 2 to 4, in particular from 2 to 3, a hydroxyl number of from 20 to 800, preferably from 80 to 700, in particular from 180 to 400, and an acid number of from 0 to 15, preferably from 0 to 4, in particular from 0 to 1, or a mixture of at least one of the abovementioned α,β-olefinically unsaturated polyesters and at least one polyoxyalkylene-polyol, preferably a polyoxypropylene-polyol or polyoxypropylene-polyoxyethylene-polyol, having a functionality of from 2 to 4, preferably from 2 to 3, and a hydroxyl number of from 20 to 400, preferably from 100 to 300, or by reacting 4,4'-MDI or a mixture of MDI isomers, preferably a mixture of 4,4'- and 2,4'-MDI, with at least one of the abovementioned α,β-olefinically unsaturated polyesters or a mixture of at least one of the abovementioned α,β-olefinically unsaturated polyesters and at least one of the abovementioned polyoxyalkylene-polyols, and subsequently diluting the resultant urethane-containing reaction product with a mixture of crude MDI.

Commercially available crude MDI grades are suitable for the preparation of the liquid, urethane-containing polyisocyanate mixtures. However, crude MDI containing from 30 to 70% by weight, preferably from 30 to 55% by weight, of MDI isomers is advantageously used.

Highly suitable are furthermore MDI isomer mixtures which contain from 48 to 96% by weight, preferably from 50 to 90% by weight, of 4,4'-MDI, from 52 to 2% by weight, preferably from 50 to 10% by weight, of 2,4'-MDI and from 0 to 2% by weight, preferably from 0 to 1.5% by weight, of 2,2'-MDI, the percent by weight data being based on the total weight of the MDI isomer mixture.

As stated above, 4,4'-MDI, the MDI isomer mixtures or crude MDI can be modified with the α,β-olefinically unsaturated polyesters or with these and polyoxyalkylene-polyols. If mixtures of α,β-olefinically unsaturated polyesters and polyoxyalkylenepolyols are employed, they expediently contain, based on the total weight, from 5 to 95% by weight, preferably from 50 to 90% by weight, of at least one α,β-olefinically unsaturated polyester and from 95 to 5% by weight, preferably from 50 to 10% by weight, of one or more polyoxyalkylene polyols.

However, instead of the mixtures, the α,β-olefinically unsaturated polyesters and polyoxyalkylenepolyols can also be reacted stepwise with the MDI isomers and/or homologs, the sequence of addition, for example first the α,β-olefinically unsaturated polyester and then the polyoxyalkylenepolyol or vice versa, generally being of secondary importance.

To prepare the liquid, urethane-containing polyisocyanate mixture, the 4,4'-MDI, the MDI isomer mixture or the crude MDI and the α,β-olefinically unsaturated polyester or the mixture of α,β-olefinically unsaturated polyesters and polyoxyalkylenepolyols are reacted at from approximately 0° to 100° C., preferably at from 30° to 80° C., for from 0.5 to 6 hours, preferably for from 1 to 3 hours, in such an amount that the NCO:OH ratio is greater than 2, preferably greater than 4, in particular from 6.3 to 81.

If 4,4'-MDI or 4,4'- and 2,4'-MDI mixtures are employed for the modification, the urethane-containing MDI mixture may, if desired, be cooled somewhat or right down to room temperature, and diluted with crude MDI to the desired NCO content in the range from 15 to 32% by weight.

As stated above, the liquid, urethane-containing polyisocyanate mixture is advantageously prepared using crude MDI having an MDI isomer content of from 30 to 70% by weight. The α,β-olefinically unsaturated polyester used has, in particular, a hydroxyl number of approximately 336 and an acid number of approximately 0.7 and is prepared by polycondensation of maleic anhydride, 1,3-propanediol and diethylene glycol in the molar ratio 1:1:1. If unsaturated polyesters and polyoxyalkylene-polyols or mixtures thereof are used to modify the polyisocyanate mixture, the polyoxyalkylene-polyols used are, in particular, those having a functionality of from 2 to 3 and a hydroxyl number of from 20 to 400 which comprise polyoxypropylene-polyols or polyoxypropylene-polyoxyethylene-polyols.

In order to reduce the viscosity of the urethane-containing polyisocyanate mixture and to improve its processing properties, it has proven advantageous, when crude MDI is used as a starting material, to additionally mix it with 2,4'-MDI, so that the 2,4'-MDI content is from 50 to 10% by weight, based on the crude MDI.

In order to reduce the viscosity, agents for improving the flow properties can be introduced into the urethane-containing polyisocyanate mixture before, during or after its preparation. Specific examples of flow improvers of this type are long-chain fatty acids, for example ricinoleic acid or oleic acid, esters of stearic acid and preferably alkylepoxystearates. In addition, the products may be stabilized by antioxidants and UV stabilizers, for example having a benzophenone structure.

If the composite element has a top layer (A) of α,β-olefinically unsaturated polyester-modified PVC or a polyvinyl chloride-containing polymer mixture, the PU foam (B) can be prepared using an organic, for example aliphatic, cycloaliphatic, araliphatic or preferably aromatic polyisocyanate which is known per se.

Specific examples are the following: alkylene diisocyanates having from 4 to 12 carbon atoms in the alkylene moiety, such as 1,12-dodecane diisocyanate, 2-ethyltetramethylene 1,4-diisocyanate, 2-methylpentamethylene 1,5-diisocyanate, tetramethylene 1,4-diisocyanate and preferably hexamethylene 1,6-diisocyanate; cycloaliphatic diisocyanates, such as cyclohexane 1,3- and 1,4-diisocyanate and any desired mixtures of these isomers, 1-isocyanato-3,3,5-trimethyl-5-isocyanatomethylcyclohexane (isophorone diisocyanate), 2,4- and 2,6-hexahydrotolylene diisocyanate and the corresponding isomer mixtures, 4,4'-,2,2'- and 2,4'-dicyclohexylmethane diisocyanate and the corresponding isomer mixtures, and preferably aromatic diisocyanates and polyisocyanates, for example 2,4- and 2,6-tolylene diisocyanate and the corresponding isomer mixtures, 4,4'-, 2,4'- and 2,2'-MDI and the corresponding isomer mixtures, mixtures of 4,4'- and 2,4'-MDI, PMDI, mixtures of 4,4'-, 2,4'- and 2,2'-diphenylmethane diisocyanates and polyphenyl-polymethylene isocyanates (crude MDI), preferably those containing from 30 to 80% by weight, based on the weight of crude MDI, of diphenylmethane diisocyanate isomers, and mixtures of crude MDI and tolylene diisocyanates. The organic diisocyanates and polyisocyanates may be employed individually or in the form of mixtures.

Also suitable are modified polyisocyanates, i.e. products obtained by the chemical reaction of organic diisocyanates and/or polyisocyanates. Specific examples are diisocyanates and/or polyisocyanates containing ester, urea, biuret, allophanate, carbodiimide, isocyanurate, uretdione and/or urethane groups. Specific examples are urethane-containing organic, preferably aromatic, polyisocyanates containing from 33.6 to 15% by weight, preferably from 31 to 21% by weight, based on the total weight, of NCO, for example 4,4'-MDI or 2,4- or 2,6-tolylene diisocyanate which has been modified with low-molecular-weight diols, triols, dialkylene glycols, trialkylene glycols or polyoxyalkylene glycols having molecular weights of up to 1800, specific examples of di- and polyoxyalkylene glycols, which can be employed individually or as mixtures, being diethylene glycol, dipropylene glycol, polyoxyethylene glycol, polyoxypropylene glycol and polyoxypropylene-polyoxyethylene glycol. Also suitable are NCO-containing prepolymers having NCO contents of from 25 to 3.5% by weight, preferably from 21 to 14% by weight, based on the total weight, and prepared from the saturated polyester- and/or preferably polyether-polyols described below and 4,4'-MDI, mixtures of 2,4'- and 4,4'-MDI, 2,4-and/or 2,6-tolylene diisocyanates or crude MDI. Furthermore, liquid polyisocyanates containing carbodiimide groups and/or isocyanurate rings and having NCO contents of from 33.6 to 15% by weight, preferably from 31 to 21% by weight, based on the total weight, for example based on 4,4'-, 2,4'- and/or 2,2'-MDI and/or 2,4- and/or 2,6-tolylene diisocyanate, have proven successful.

The modified polyisocyanates can, if desired, be mixed with one another or with unmodified organic polyisocyanates, for example 2,4'- and 4,4'-MDI, PMDI, crude MDI or 2,4- and/or 2,6-tolylene diisocyanate.

The aromatic polyisocyanate preferably used to prepare semirigid and rigid PU foams is, in particular, crude MDI.

b) The relatively high-molecular-weight polyhydroxyl compound b) containing at least two reactive hydrogen atoms expediently has a functionality of from 2 to 8, and a hydroxyl number of from 25 to 800. Success has been achieved, for example, using polyhydroxyl compounds selected from the group comprising the polyether-polyols, polyester-polyols, prepared from alkanedicarboxylic acids and polyhydric alcohols, by the polythioether polyols, polyester amides, hydroxyl-containing polyacetals and hydroxyl-containing aliphatic polycarbonates, or mixtures of at least two of said polyols. Particular preference is given to polyester-polyols and/or, in particular, polyether polyols.

Suitable polyester-polyols may be prepared, for example, from alkanedicarboxylic acids having from 2 to 12 carbon atoms, preferably alkanedicarboxylic acids having from 4 to 6 carbon atoms, or mixtures of alkanedicarboxylic acids and aromatic polycarboxylic acids, and polyhydric alcohols, preferably diols, having from 2 to 12 carbon atoms, preferably from 2 to 6 carbon atoms, and/or alkylene glycols. Examples of suitable alkanedicarboxylic acids are succinic acid, glutaric acid, adipic acid, suberic acid, azelaic acid, sebacic acid and decanedicarboxylic acid. Examples of suitable aromatic polycarboxylic acids are phthalic acid, isophthalic acid and terephthalic acid. The alkanedicarboxylic acids may be used either individually or mixed with one another. The free dicarboxylic acids may also be replaced by the corresponding dicarboxylic acid derivatives, for example dicarboxylic acid mono- and/or diesters of alcohols having from 1 to 4 carbon atoms or dicarboxylic anhydrides. Preference is given to dicarboxylic acid mixtures comprising succinic acid, glutaric acid and adipic acid in a ratio of, for example, from 20 to 35:35 to 50:20 to 32 parts by weight, and in particular adipic acid. Examples of dihydric and polyhydric alcohols, in particular diols or alkylene glycols, are ethanediol, diethylene glycol, 1,2- and 1,3-propanediol, dipropylene glycol, 1,4-butanediol, 1,5-pentanediol, 1,6-hexanediol, 1,10-decanediol, glycerol and trimethylolpropane. Preference is given to ethanediol, diethylene glycol, 1,4-butanediol, 1,5-pentanediol, 1,6-hexanediol or mixtures of at least two of said diols, in particular mixtures of 1,4-butanediol, 1,5-pentanediol and 1,6-hexanediol. It is furthermore possible to employ polyester-polyols made from lactones, for example ε-caprolactone or hydroxycarboxylic acids, e.g. ω-hydroxycaproic acid.

The polyester-polyols may be prepared by polycondensing the mixtures of aromatic and aliphatic dicarboxylic acids and preferably alkanedicarboxylic acids and/or derivatives thereof and polyhydric alcohols without using a catalyst or preferably in the presence of an esterification catalyst, expediently in an inert-gas atmosphere, for example nitrogen, helium, argon, inter alia, in the melt at from 150° to 250° C., preferably from 180° to 220° C., at atmospheric pressure or under reduced pressure until the desired acid number, which is advantageously less than 10, preferably less than 2, has been reached. In a preferred embodiment, the esterification mixture is polycondensed at the abovementioned temperatures under atmospheric pressure and subsequently under a pressure of less than 500 mbar, preferably at from 50 to 150 mbar, until an acid number of from 80 to 30, preferably from 40 to 30, has been reached. Examples of esterification catalysts are iron, cadmium, cobalt, lead, zinc, antimony, magnesium, titanium and tin catalysts in the form of metals, metal oxides or metal salts. However, the polycondensation may also be carried out in liquid phase in the presence of diluents and/or entrainers, e.g. benzene, toluene, xylene or chlorobenzene, for removal of the water of condensation by azeotropic distillation.

The polyester-polyols are advantageously prepared by polycondensing the organic polycarboxylic acids and/or derivatives thereof with polyhydric alcohols in a molar ratio of from 1:1 to 1.8, preferably from 1:1.05 to 1.2.

The polyester-polyols obtained preferably have a functionality of from 2 to 4, in particular from 2 to 3, and a hydroxyl number of from 25 to 800, preferably from 120 to 400, in particular from 180 to 300.

However, the preferred polyhydroxyl compounds are polyether-polyols prepared by conventional processes, for example by anionic polymerization using alkali metal hydroxides, such as sodium hydroxide or potassium hydroxide, or alkali metal alkoxides, such as sodium methoxide, sodium ethoxide, potassium ethoxide or potassium isopropoxide, as catalysts and with addition of at least one initiator molecule containing from 2 to 8 reactive hydrogen atoms in bound form, or by cation polymerization using Lewis acids, such as antimony pentachloride, boron fluoride etherate, inter alia, or bleaching earth as catalysts, from one or more alkylene oxides having from 2 to 4 carbon atoms in the alkylene moiety.

Examples of suitable alkylene oxides are tetrahydrofuran, 1,3-propylene oxide, 1,2- and 2,3-butylene oxide, styrene oxide and preferably ethylene oxide and 1,2-propylene oxide. The alkylene oxides may be used individually, or alternately one after the other or as mixtures. Examples of suitable initiator molecules are water, organic dicarboxylic acids, such as succinic acid, adipic acid, phthalic acid and terephthalic acid, and preferably polyhydric alcohols, in particular dihydric to octahydric alcohols, or dialkylene glycols, such as ethanediol, 1,2- and 1,3-propanediol, diethylene glycol, dipropylene glycol, 1,4-butanediol, 1,6-hexanediol, glycerol, trimethylolpropane, pentaerythritol, sorbitol and sucrose.

The polyether-polyols, preferably polyoxypropylene- and polyoxypropylene-polyoxyethylene-polyols, have, for the preparation of semirigid PU foams, a functionality of, preferably, from 2 to 4, in particular 2 and/or 3, and hydroxyl numbers of, preferably, from 20 to 400, in particular from 25 to 300, and suitable polyoxytetramethylene glycols have a hydroxyl number of up to approximately 56, and, for the preparation of rigid PU foams, have a functionality of, preferably, from 3 to 8, in particular from 3 to 6, and a hydroxyl number of, preferably, from 180 to 800, in particular from 200 to 500.

Other suitable polyether-polyols are polymer-modified polyether-polyols, preferably graft polyether-polyols, in particular those based on styrene and/or acrylonitrile and prepared by in-situ polymerization of acrylonitrile, styrene or preferably mixtures of styrene and acrylonitrile, for example in a weight ratio of from 90:10 to 10:90, preferably from 70:30 to 30:70, expediently in the abovementioned polyether-polyols by a method similar to that of German Patents 11 11 394, 12 22 669 (U.S. Pat. Nos. 3,304,273, 3,383,351 and 3,523,093), 11 52 536 (GB 1,040,452) and 11 52 537 (GB 987,618), and polyether-polyol dispersions which contain, as the disperse phase, usually in an amount of from 1 to 50% by weight, preferably from 2 to 25% by weight, for example polyureas, polyhydrazides, polyurethanes containing tert-amino groups in bound form, and/or melamine and are described, for example, in EP-B-011 752 (U.S. Pat. No. 4,304,708), U.S. Pat. No. 4,374,209 and DE-A-32 31 497.

Like the polyester-polyols, the polyether-polyols can be used individually or in the form of mixtures. To prepare elastic, semirigid or rigid PU foams, it may be expedient, for example, to use suitable mixtures of polyether-polyols having hydroxyl numbers of up to 80 and those having hydroxyl numbers of from 200 to 500. Furthermore, they can be mixed with the polymer-modified polyether-polyols or polyesterpolyols and the hydroxyl-containing polyester-amides, polyacetals and/or polycarbonates.

Examples of suitable hydroxyl-containing polyacetals are the compounds which can be prepared from glycols, such as diethylene glycol, triethylene glycol, 4,4'-dihydroxyethoxydiphenyldimethylmethane, hexanediol and formaldehyde. Suitable polyacetals can also be prepared by polymerizing cyclic acetals.

Suitable hydroxyl-containing polycarbonates are those of a conventional type, which can be prepared, for example, by reacting diols, such as 1,3-propanediol, 1,4-butanediol and/or 1,6-hexanediol, diethylene glycol, triethylene glycol or tetraethylene glycol, with diaryl carbonates, for example diphenyl carbonate, or phosgene.

The hydroxyl-containing polyester-amides include, for example, the predominantly linear condensates obtained from polybasic, saturated and/or unsaturated carboxylic acids or anhydrides thereof and polyhydric, saturated and/or unsaturated aminoalcohols, or mixtures of polyhydric alcohols and aminoalcohols and/or polyamines.

c) The PU foam can be prepared with or without the additional use of chain extenders and/or crosslinking agents. In order to modify the mechanical properties, for example the hardness, however, the addition of chain extenders, crosslinking agents and possibly also mixtures thereof may prove advantageous. The chain extenders and/or crosslinking agents used are diols and/or triols having molecular weights of less than 400, preferably from 60 to 300. Examples are aliphatic, cycloaliphatic and/or araliphatic diols having from 2 to 14 carbon atoms, preferably from 4 to 10 carbon atoms, e.g. ethylene glycol, 1,3-propanediol, 1,10-decanediol, o-, m- and p-dihydroxycyclohexane, diethylene glycol, dipropylene glycol and preferably 1,4-butanediol, 1,6-hexanediol and bis (2-hydroxyethyl)hydroquinone, triols, such as 1,2,4- and 1,3,5-trihydroxycyclohexane, glycerol and trimethylolpropane, and low-molecular-weight hydroxyl-containing polyalkylene oxides based on ethylene oxide and/or 1,2-propylene oxide and the abovementioned diols and/or triols as initiator molecules.

If chain extenders, crosslinking agents or mixtures thereof are used, they can expediently be employed in amounts of from 2 to 60% by weight, preferably from 8 to 50% by weight, in particular from 10 to 40% by weight, based on the weight of components (b) and (c).

d) The blowing agents (d) which can be used to prepare the PU foam preferably include water, which reacts with isocyanate groups to form carbon dioxide as the blowing gas. The amount of water expediently employed is from 0.1 to 8 parts by weight, preferably from 1.0 to 3.5 parts by weight, in particular from 2.0 to 3.0 parts by weight, based on 100 parts by weight of the relatively high-molecular-weight compound containing at least two reactive hydrogen atoms (b).

The water may advantageously also be replaced by acidic buffer solutions, preferably those having a pH of from 1.6 to 3.8.

Other suitable blowing agents are carboxylic acids, e.g. formic acid or acetic acid, or tertiary alcohols which contain at least one hydrogen atom bonded to the directly carbinol-bonded carbon, e.g. tert-butanol.

It is also possible to employ physical blowing agents, mixed with water or the buffer solutions or as the only blowing agent. Suitable compounds are liquids which are inert toward the organic, modified or unmodified polyisocyanate (a) and have boiling points below 100° C., preferably below 50° C., in particular from −50° to 30° C. at atmospheric pressure, so that they evaporate under the influence of the exothermic polyaddition reaction. Examples of preferred liquids of this type are hydrocarbons, such as n- and isopentane, technical-grade pentane mixtures, n- and isobutane and propane, ethers, such as furan, dimethyl ether and diethyl ether, ketones, such as acetone and methyl ethyl ketone, esters, such as ethyl acetate and methyl formate, and preferably halogenated hydrocarbons, such as methylene chloride, difluoromethane, trichlorofluoromethane, dichlorodifluoromethane, dichloromonofluoromethane, 1,1,1-dichlorofluoroethane, 1,1,1-chlorodifluoroethane, dichlorotetrafluoroethane, tetrafluoroethane, 1,1,2-trichloro-1,2,2-trifluoroethane and heptafluoropropane, and noble gases, e.g. krypton. Mixtures of these low-boiling liquids with one another and/or with other substituted or unsubstituted hydrocarbons can also be used.

The necessary amount of physical blowing agent can be determined simply depending on the desired foam density and is from 0 to approximately 30 parts by weight, preferably from 0 to 20 parts by weight, per 100 parts by weight of the relatively high-molecular-weight compound (b), its proportion being reduced proportionately if water or buffer solution is additionally used. It may be expedient to mix the modified or unmodified polyisocyanate (a) with the physical blowing agent and thus to reduce its viscosity.

e) In order to accelerate the reaction between the relatively high-molecular-weight compounds containing at least two reactive hydrogen atoms (b), the hydroxyl-containing chain extender or crosslinking agent (c) and water as blowing agent (d) and the organic polyisocyanate and/or modified polyisocyanate (a), a conventional polyurethane catalyst is incorporated into the reaction mixture. Examples of suitable polyurethane catalysts are tertiary amines, such as dimethylbenzylamine, dicyclohexylmethylamine, dimethylcyclohexylamine, N,N,N',N'-tetramethyldiaminodiethyl ether, bis(dimethylaminopropyl)urea, N-methyl- and N-ethylmorpholine, dimethylpiperazine, N-dimethylaminoethylpiperidine, 1,2-dimethylimidazole, 1-azabicyclo[2.2.0]octane, dimethylaminoethano 2-(N,N-dimethylaminoethoxy)-ethanol, N,N',N"-tris(dialkylaminoalkyl)hexahydrotriazine, for example N,N', N"-tris(dimethylaminopropyl)-s-hexahydrotriazine, di(4-dimethylaminocyclohexyl)methane and, in particular, triethylenediamine.

However, since it has proven expedient to prepare the PU foam in the absence of compounds containing tertiary amino groups, the polyurethane catalyst is preferably a metal salt. Specific examples are metal salts such as iron(II) chloride, zinc chloride, lead octanoate, tin dioctanoate, tin diethylhexanoate, dibutyldilauryltin mercaptide, dibutyltin dilaurate and preferably alkali metal salts of organic carboxylic acids, e.g. potassium formate and potassium acetate. From 0.1 to 5% by weight, preferably from 0.3 to 3.5% by weight, of metal salts are usually employed as polyurethane catalyst, based on the weight of the relatively high-molecular-weight compounds (b).

f) It is also possible to incorporate assistants and/or additives (f) into the reaction mixture for the preparation of the PU foam. Specific examples are surfactants, stabilizers, hydrolysis-protection agents, pore regulators, fungistatic and bacteriostatic substances, dyes, pigments and fillers.

Examples of suitable surfactants are compounds which serve to support homogenization of the starting materials and may also be suitable for regulating the cell structure of the foam. Specific examples are siloxane-oxyalkylene copolymers and other organopolysiloxanes, oxyethylated alkylphenols, oxyethylated fatty alcohols, paraffin oils, castor oil esters, ricinoleic acid esters and Turkey red oil, which are used in amounts of from 0.05 to 8 parts by weight, preferably from 0.4 to 5 parts by weight, per 100 parts by weight of the relatively high-molecular-weight compound (b).

Further details on the other conventional assistants and additives mentioned above can be obtained from the specialist literature, for example from the monograph by J. H. Saunders and K. C. Frisch, High Polymers, Volume XVI, Polyurethanes, Parts 1 and 2, Interscience Publishers, 1962 and 1964 respectively, or Kunststoff-Handbuch, Polyurethane, Volume VII, Hanser-Verlag, Munich, Vienna, 1st and 2nd Editions, 1966 and 1983.

The PU foam or PVC/PU foam composite element is produced by reacting the organic, preferably modified polyisocyanate (a), the relatively high-molecular-weight polyhydroxyl compound containing at least two reactive hydrogen atoms (b) and, if desired, the chain extenders and/or crosslinking agents (c) in the presence of a blowing agent (d), catalyst (e) and, if desired, assistants and/or additives (f) at from 0° to 100° C., preferably at from 15° to 80° C., in such mixing ratios that from 0.5 to 2, preferably from 0.8 to 1.3, in particular approximately one, reactive hydrogen atom(s) bonded to the starting components (b) and (c) is (are) present per NCO group, and, if water is employed as the blowing agent, the molar ratio between the number of equivalents of water and the number of equivalents of NCO groups is from 0.5 to 5:1, preferably from 0.7 to 0.95:1, in particular from 0.75 to 0.85:1.

The PU foam or the PU foam of the composite element is expediently prepared by the one-shot process by mixing two components A and B, the starting components (b) to (e) and, if used, (f) being combined to form component A and the starting component (a), if desired mixed with (f), and an inert, physical blowing agent being used as component B. Thus, it is only necessary to thoroughly mix components A and B before preparation of the PU foam. The reaction mixture can be foamed in an open or closed mold.

To produce the composite element, the top layer (A), which, as stated above, comprises PVC or a polyvinyl chloride-containing polymer mixture or an α,β-olefinically unsaturated polyester-modified PVC or a modified polyvinyl chloride-containing polymer mixture, is laid into an expediently temperature-controlled, preferably metallic mold in such a manner that its inner surface is partially or fully covered. The mold temperature is usually from 20° to 90° C., preferably from 35° to 70° C. The reaction mixture, which preferably contains at least one α,β-olefinically unsaturated polyester in bonded form or is without this modification, is then introduced into the remaining mold cavity in order to form the PU foam and is allowed to expand and cure therein. The reaction mixture is usually at from 23° to 80° C., preferably at from 35° to 60° C., and is expediently introduced into the mold in such an amount that a degree of compaction of from 1.1 to 6, preferably from 1.1 to 3, in particular from 1.1 to 1.5, is produced in the closed mold.

The composite element according to the invention, in which at least one of the constituents (A) and (B), namely the top layer or the PU foam, contains at least one α,β-unsaturated polyester having a molecular weight factor per double bond of from 150 to 3000, can be demolded after from 3 to 10 minutes, preferably from 3 to 5 minutes.

The element has an overall density of from 30 to 800 g/l, preferably from 80 to 150 g/l, and has very good mechanical properties. It is preferably used in the interior of vehicles, in particular in motor vehicles, for example as armrests, headrests, sun visors, dashboards, parcel shelves or oddment trays and safety covers.

The liquid, urethane-containing polyisocyanate mixtures which have been modified with α,β-olefinically unsaturated polyesters are used as the polyisocyanate component for the preparation of polyisocyanate polyaddition products, for example of soft-elastic or preferably semirigid and rigid PU foams. They are furthermore suitable for mixing with liquid, urethane-containing quasi-prepolymers prepared from the abovementioned organic, preferably aromatic, polyisocyanates, e.g. tolylene diisocyanate, MDI, PMDI or crude MDI, and polyoxyalkylene-polyols, preferably polyoxypropylene-polyols or polyoxypropylene-polyoxyethylene-polyols.

EXAMPLES

Preparation of the Liquid, Urethane-containing Polyisocyanate Mixtures

EXAMPLE 1

80.56 parts by weight of an α,β-olefinically unsaturated polyester-diol having a hydroxyl number of 336, an acid number of 0.7 and a molecular weight factor per double bond of 262, prepared by polycondensing maleic anhydride, 1,3-propanediol and diethylene glycol in the molar ratio 1:1:51, was added in portions at 60° C. with stirring to 1419.14 parts by weight of a mixture of diphenylmethane diisocyanates and polyphenyl-polymethylene polyisocyanates (crude MDI) containing 31% by weight of NCO and containing 39% by weight, based on the total weight, of diphenylmethane diisocyanate isomers.

When the addition of the α,β-olefinically unsaturated polyester-diol was complete, the reaction mixture was stirred at 80° C. for a further hour and then allowed to cool to room temperature.

A urethane-modified polyisocyanate mixture containing 27.27% by weight of NCO and having a viscosity at 25° C. of 1830 mPa.s was obtained.

EXAMPLES 2 TO 5

The procedure was similar to that of Example 1, but a mixture of the abovementioned crude MDI and a mixture of 2,4'- and 4,4'-MDI in the weight ratio 1:1 was used.

The amounts of starting materials employed and the NCO contents and viscosities of the urethane-containing polyisocyanate mixtures prepared are shown in the table below.

TABLE

| | Mixture of | | | Urethane-containing polyisocyanate mixture | |
|---|---|---|---|---|---|
| Example | crude MDI [parts by wt.] | and the mixture of 2,4'- and 4,4'-MDI [parts by wt.] | Polyester-diol [parts by wt.] | NCO cont. [% by wt.] | Viscosity at 25° C. [mPa · s] |
| 2 | 570 | 380 | 50 | 29.62 | 354 |
| 3 | 665 | 285 | 50 | 27.76 | 525 |
| 4 | 760 | 190 | 50 | 28.06 | 737.5 |
| 5 | 855 | 95 | 50 | 27.74 | 1244 |

EXAMPLE 6

The procedure was similar to that of Example 1, but the polyisocyanate used was a mixture of
655 parts by weight of crude MDI and
279 parts by weight of a mixture of 2,4'- and 4,4'-MDI in the weight ratio 1:1,
and the polyhydroxyl compound used was a mixture of
50 parts by weight of the α,β-olefinically unsaturated polyester-diol of Example 1 and
20 parts by weight of a glycerol-initiated polyoxypropylene (25.8% by weight)-polyoxyethylene (74.2% by weight)-polyol having an OH number of 42.

The urethane-containing polyisocyanate mixture obtained was homogeneous and had an NCO content of 7.63% by weight and a viscosity at 25° C. of 614 mPa.s.

EXAMPLE 7

The procedure was similar to that of Example 6, but the polyisocyanate used was a mixture of
651 parts by weight of crude MDI and
279 parts by weight of a carbodiimide-containing 4,4'-MDI mixture containing 29.5% by weight of NCO.

A urethane- and carbodiimide-containing polyisocyanate mixture having an NCO content of 26.5% by weight and a viscosity at 25° C. of 1396 mPa.s was obtained.

EXAMPLE 8

The procedure was similar to that of Example 6, but the polyisocyanate used was a mixture of
651 parts by weight of crude MDI and
279 parts by weight of a urethane-containing polyisocyanate mixture containing 23% by weight of NCO and prepared by reacting 4,4'-MDI with a mixture of dipropylene glycol and a dipropylene glycol-initiated polyoxypropylene glycol having a hydroxyl number of 250.

A urethane-containing polyisocyanate mixture having an NCO content of 25.33% by weight and a viscosity at 25° C. of 4490 mPa.s was obtained.

EXAMPLE 9

The procedure was similar to that of Example 6, but the polyisocyanate used was a mixture of
651 parts by weight of crude MDI and
279 parts by weight of 4,4'-MDI.

A urethane-containing polyisocyanate mixture having an NCO content of 27.1% by weight and a viscosity at 25° C. of 550.6 mPa.s was obtained.

EXAMPLE 10

1000 parts by weight of the urethane-containing polyisocyanate mixture of Example 4 and
1000 parts by weight of a urethane-containing polyisocyanate mixture having an NCO content of 27.1% by weight and a viscosity at 25° C. of 1011 mPa.s, itself prepared by reacting
912.14 parts by weight of crude MDI as in Example 1 and
87.86 parts by weight of a glycerol-initiated polyoxypropylene (25.8% by weight)-polyoxyethylene (74.2% by weight)-polyol having an OH number of 42,
were mixed intensively at 23° C.

A urethane-containing polyisocyanate mixture having an NCO content of 27.6% by weight and a viscosity at 25° C. of 880 mPa.s was obtained.

EXAMPLE 11

331 parts by weight of the α,β-olefinically unsaturated polyester-diol having a hydroxyl number of 336 and described in Example 1 were added in portions with stirring at 80° C. to 1325 parts by weight of 4,4'-diphenylmethane diisocyanate.

When the addition of the α,β-olefinically unsaturated polyester-diol was complete, the reaction mixture was stirred at 80° C. for a further hour and then allowed to cool to 25° C.

The urethane-modified polyisocyanate mixture, which had an NCO content of 22.8% by weight and a viscosity at 25° C. of 3000 mPa.s, was then mixed with 3344 parts by weight of the crude MDI described in Example 1 with vigorous stirring.

The urethane-containing polyisocyanate mixture prepared had an NCO content of 27.8% by weight and a viscosity at 25° C. of 628 mPa.s.

EXAMPLE 12

380 parts by weight of an α,β-olefinically unsaturated polyester-diol having a hydroxyl number of 200, an acid number of 3 and a molecular weight factor per double bond of 262 and prepared by polycondensing fumaric acid, 1,3-propanediol and diethylene glycol in the molar ratio 1:1:1 were added in portions with stirring at 80° C. to 380 parts by weight of a mixture of 2,4'- and 4,4'-diphenylmethane diisocyanate in the weight ratio 1:1.

When the addition of the α,β-olefinically unsaturated polyester-diol was complete, the reaction mixture was stirred at 80° C. for a further hour, cooled to 50° C. and mixed at this temperature with 570 parts by weight of the crude MDI described in Example 1.

A urethane-containing polyisocyanate mixture having an NCO content of 29.4% by weight and a viscosity at 25° C. of 10000 mPa.s was obtained.

EXAMPLE 13

The procedure was similar to that of Example 1, but the polyisocyanate used was a mixture of
651 parts by weight of crude MDI and
279 parts by weight of a mixture of 2,4'- and 4,4'-MDI in the weight ratio 1:1,
and the polyhydroxyl compound used was a mixture of
50 parts by weight of the α,β-olefinically unsaturated polyester-diol of Example 1 and
20 parts by weight of a trimethylolpropane-initiated polyoxyethylene (95% by weight)-polyoxypropylene (5% by weight)-polyol having a hydroxyl number of 101.

A urethane-containing polyisocyanate mixture having an NCO content of 27.7% by weight and a viscosity at 25° C. of 652 mPa.s was obtained.

Production of the composite elements and preparation of the PU foams which can be used according to the invention for this purpose.

EXAMPLE 14

Colored or uncolored films of PVC/ABS polymer mixtures or PVC were laid into a metallic mold having the internal dimensions 20×20×4 cm and held at 50° C. in such a manner that the base of the mold was completely covered.

The mold was closed, and the foamable PU reaction mixture was introduced into the mold cavity and allowed to expand and cure therein.

The composite element formed was demolded after 3 minutes. After storage for 24 hours at 23° C., the composite element was sawn into a number of test specimens, which were stored individually in glass bottles at 120° C. in a circulation drying oven.

After storage for 300 and 500 hours respectively at 120° C., the test specimens were removed and the film used as top layer was separated from the PU foam using a knife.

The tear strength and elongation at break of the film and PU foam were measured in the DIN 53 571 tensile test.

In the measurement results listed below, the line "0 hours" shows the comparison values for the films employed and the uncoated PU foam after storage for 24 hours at 23° C.

The semirigid PU foam was prepared using the following starting materials:

Component A

Mixture comprising
87.7 parts by weight of a glycerol-initiated polyoxypropylene (86% by weight)-polyoxyethylene (14% by weight)-polyol having a hydroxyl number of 28 (Lupranol ® 2040 from BASF Aktiengesellschaft),
5.0 parts by weight of a graft polyether-polyol having a hydroxyl number of 28, comprising a glycerol-initiated polyoxypropylene (84% by weight)-polyoxyethylene (16% by weight)-polyol onto which 20% by weight of a mixture of acrylonitrile and styrene in the weight ratio 40:60 had been grafted (Polyurax ® U2603 from BP, Germany),
2.0 parts by weight of glycerol (98% by weight),
2.2 parts by weight of water,
1.5 parts by weight of potassium acetate (40% strength by weight in ethylene glycol) and
1.6 parts by weight of ricinoleic acid.

Component B

Urethane-containing polyisocyanate mixture, prepared as described in Example 1.

To prepare the PU foam
100 parts by weight of component A and
58.7 parts by weight of component B were mixed thoroughly by stirring at 23° C., and 250 g of the reaction mixture was introduced into the mold and allowed to expand and cure therein.

In addition, the reaction mixture was foamed in an open plastic cup, giving the following foam data:
 initiation times: 31 seconds
 setting time: 67 seconds
 rise times: 94 seconds.

The following measurement results were determined for the top layers used to produce the composite elements:

| Film material of the top layer | Storage at 120° C. [hours] | Tear strength [N/mm²] | Elongation at break [%] |
| --- | --- | --- | --- |
| PVC/ABS polymer mixture, dyed blue | 0 | 9.18 | 99 |
|  | 300 | 16.34 | 138 |
|  | 500 | 16.47 | 75 |
| PVC/ABS polymer mixture, dyed gray | 0 | 12.1 | 103 |
|  | 300 | 15.2 | 129 |
|  | 500 | 16.3 | 71 |
| PVC/ABS polymer mixture, dyed black | 0 | 10.7 | 91 |
|  | 300 | 17 | 127 |
|  | 500 | 14.8 | 91 |
| PVC slush | 0 | 12 | 319 |
|  | 300 | 11 | 234 |
|  | 500 | 20 | 195 |

EXAMPLE 15

The procedure was similar to that of Example 14
Component A
As in Example 14
Component B
Urethane-containing polyisocyanate mixture, prepared as described in Example 2.
To prepare the PU foam,
100 parts by weight of component A and
55.35 parts by weight of component B
were mixed thoroughly by stirring at 23° C., and 250 g of the reaction mixture were introduced into the mold and allowed to expand and cure therein.

The following foam data were measured for expansion in an open plastic cups
 initiation times: 29 seconds
 setting times: 81 seconds
 rise times: 133 seconds.

| Constituents of the composite element | Storage at 120° C. [hours] | Tear strength [N/mm²] | Elongation at break [%] |
| --- | --- | --- | --- |
| Film made from a PVC/ABS polymer mixture, dyed gray | 0 | 13.52 | 169.84 |
|  | 300 | 18.02 | 174.60 |
|  | 500 | 15.05 | 76.40 |
| PU foam | 0 | 0.32 | 63.66 |
|  | 300 | 0.22 | 33.44 |
|  | 500 | 0.21 | 22.04 |

EXAMPLE 16

The procedure was similar to that of Example 14.
Component A
As in Example 14
Component B
Urethane-containing polyisocyanate mixture, prepared as described in Example 3.
To prepare the PU foam,
100 parts by weight of component A and
58.93 parts by weight of component B
were mixed thoroughly by stirring at 23° C., and 250 g of the reaction mixture were introduced into the mold and allowed to expand and cure therein.

The following foam data were measured for expansion in an open plastic cup:
 initiation time: 30 seconds
 setting time: 79 seconds
 rise time: 128 seconds.

| Constituents of the composite element | Storage at 120° C. [hours] | Tear strength [N/mm²] | Elongation at break [%] |
| --- | --- | --- | --- |
| Film made from a PVC/ABS polymer mixture, dyed gray | 0 | 13.89 | 176.0 |
|  | 300 | 17.87 | 189.8 |
|  | 500 | 15.71 | 76.0 |
| PU foam | 0 | 0.33 | 57.02 |
|  | 300 | 0.32 | 30.64 |
|  | 500 | 0.28 | 22.44 |

EXAMPLE 17

The procedure was similar to that of Example 14.
Component A
As in Example 14
Component B
Urethane-containing polyisocyanate mixture, prepared as described in Example 4.
To prepare the PU foam,
100 parts by weight of component A and
58.30 parts by weight of component B
were mixed thoroughly by stirring at 23° C., and 250 g of the reaction mixture were introduced into the mold and allowed to expand and cure therein.

The following foam data were measured for expansion in an open plastic cup:
 initiation time: 30 seconds
 setting time: 78 seconds
 rise time: 123 seconds.

| Constituents of the composite element | Storage at 120° C. [hours] | Tear strength [N/mm²] | Elongation at break [%] |
| --- | --- | --- | --- |
| Film made from a PVC/ABS polymer mixture, dyed gray | 0 | 14.66 | 172.0 |
|  | 300 | 18.54 | 187.7 |
|  | 500 | 15.13 | 87.3 |
| PU foam | 0 | 0.33 | 51.64 |
|  | 300 | 0.22 | 28.64 |
|  | 500 | 0.20 | 20.24 |

EXAMPLE 18

The procedure was similar to that of Example 14.
Component A
As in Example 14
Component B
Urethane-containing polyisocyanate mixture, prepared as described in Example 5.
To prepare the PU foam,
100 parts by weight of component A and
59.14 parts by weight of component B
were mixed thoroughly by stirring at 23° C., and 250 g of the reaction mixture were introduced into the mold and allowed to expand and cure therein.

The following foam data were measured for expansion in an open plastic cup:
 initiation time: 28 seconds
 setting time: 79 seconds
 rise time: 120 seconds.

| Constituents of the composite element | Storage at 120° C. [hours] | Tear strength [N/mm²] | Elongation at break [%] |
| --- | --- | --- | --- |
| a) Film made from a PVC/ABS polymer mixture, dyed gray | 0 | 13.29 | 166.64 |
| | 300 | 17.18 | 155.40 |
| | 500 | 13.38 | 74.80 |
| a) PU foam | 0 | 0.29 | 48.72 |
| | 300 | 0.19 | 26.20 |
| | 500 | 0.17 | 19.28 |
| b) Film made from a PVC/ABS polymer mixture, dyed wine red | 0 | 19.40 | 137.12 |
| | 300 | 18.50 | 101.1 |
| | 500 | 13.69 | 64.7 |
| a) PU foam | 0 | 0.29 | 49.68 |
| | 300 | 0.24 | 37.68 |
| | 500 | 0.22 | 32.12 |

EXAMPLE 19

The procedure was similar to that of Example 14.
Component A
As in Example 14
Component B
Urethane-containing polyisocyanate mixture, prepared as described in Example 6.
To prepare the PU foam,
100 parts by weight of component A and
59.36 parts by weight of component B were mixed thoroughly by stirring at 23° C., and 250 g of the reaction mixture were introduced into the mold and allowed to expand and cure therein.
The following foam data were measured for expansion in an open plastic cup:
  initiation time: 31 seconds
  setting time: 76 seconds
  rise time: 126 seconds.

| Constituents of the composite element | Storage at 120° C. [hours] | Tear strength [N/mm²] | Elongation at break [%] |
| --- | --- | --- | --- |
| Film made from a PVC/ABS polymer mixture, dyed gray | 0 | 12.56 | 168.24 |
| | 300 | 19.10 | 174.76 |
| | 500 | 15.43 | 76.50 |
| PU foam | 0 | 0.32 | 56.64 |
| | 300 | 0.24 | 35.92 |
| | 500 | 0.22 | 24.96 |

EXAMPLE 20

The procedure was similar to that of Example 14.
Component A
As in Example 14
Component B
Urethane-containing polyisocyanate mixture, prepared as described in Example 7.
To prepare the PU foam,
100 parts by weight of component A and
61.82 parts by weight of component B
were mixed thoroughly by stirring at 23° C., and 250 g of the reaction mixture were introduced into the mold and allowed to expand and cure therein.
The following foam data were measured for expansion in an open plastic cup:
  initiation times 31 seconds
  setting time: 78 seconds
  rise time: 114 seconds.

| Constituents of the composite element | Storage at 120° C. [hours] | Tear strength [N/mm²] | Elongation at break [%] |
| --- | --- | --- | --- |
| Film made from a PVC/ABS polymer mixture, dyed gray | 0 | 15.52 | 162.36 |
| | 300 | 14.90 | 176.50 |
| | 500 | 17.27 | 105.10 |
| PU foam | 0 | 0.29 | 53.52 |
| | 300 | 0.19 | 30.44 |
| | 500 | 0.21 | 25.12 |

EXAMPLE 21

The procedure was similar to that of Example 14.
Component A
As in Example 14
Component B
Urethane-containing polyisocyanate mixture, prepared as described in Example 8.
To prepare the PU foam,
100 parts by weight of component A and
67.7 parts by weight of component B
were mixed thoroughly by stirring at 23° C., and 250 g of the reaction mixture were introduced into the mold and allowed to expand and cure therein.
The following foam data were measured for expansion in an open plastic cup:
  initiation time: 30 seconds
  setting time: 76 seconds
  rise time: 128 seconds.

| Constituents of the composite element | Storage at 120° C. [hours] | Tear strength [N/mm²] | Elongation at break [%] |
| --- | --- | --- | --- |
| Film made from a PVC/ABS polymer mixture, dyed gray | 0 | 14.58 | 151.84 |
| | 300 | 15.79 | 177.4 |
| | 500 | 15.18 | 112.0 |
| PU foam | 0 | 0.34 | 51.44 |
| | 300 | 0.22 | 29.76 |
| | 500 | 0.22 | 24.16 |

EXAMPLE 22

The procedure was similar to that of Example 14.
Component A
As in Example 14
Component B
Urethane-containing polyisocyanate mixture, prepared as described in Example 13.
To prepare the PU foam,
100 parts by weight of component A and
59.14 parts by weight of component B
were mixed thoroughly by stirring at 23° C., and 250 g of the reaction mixture were introduced into the mold and allowed to expand and cure therein.
The following foam data were measured for expansion in an open plastic cup:
  initiation time: 29 seconds
  setting time: 78 seconds
  rise time: 123 seconds.

| Constituents of the composite element | Storage at 120° C. [hours] | Tear strength [N/mm²] | Elongation at break [%] |
| --- | --- | --- | --- |
| Film made from a PVC/ABS polymer mixture, dyed gray | 0 | 14.13 | 154.48 |
| | 300 | 16.00 | 168.80 |
| | 500 | 19.05 | 83.50 |
| PU foam | 0 | 0.29 | 53.52 |

-continued

| Constituents of the composite element | Storage at 120° C. [hours] | Tear strength [N/mm$^2$] | Elongation at break [%] |
|---|---|---|---|
| | 300 | 0.19 | 36.72 |
| | 500 | 0.18 | 30.88 |

EXAMPLE 23

The procedure was similar to that of Example 14.
Component A
As in Example 14
Component B
Urethane-containing polyisocyanate mixture, prepared as described in Example 9.
To prepare the PU foam,
100 parts by weight of component A and
60.45 parts by weight of component B
were mixed thoroughly by stirring at 23° C., and 250 g of the reaction mixture were introduced into the mold and allowed to expand and cure therein.
The following foam data were measured for expansion in an open plastic cups
initiation time: 30 seconds
setting time: 75 seconds
rise time: 121 seconds.

| Constituents of the composite element | Storage at 120° C. [hours] | Tear strength [N/mm$^2$] | Elongation at break [%] |
|---|---|---|---|
| Film made from a PVC/ABS polymer mixture, dyed gray | 0 | 14.90 | 158.88 |
| | 300 | 15.58 | 168.70 |
| | 500 | 16.09 | 94.00 |
| PU foam | 0 | 0.30 | 51.52 |
| | 300 | 0.25 | 34.48 |
| | 500 | 0.24 | 27.84 |

EXAMPLE 24

The procedure was similar to that of Example 14.
Component A
As in Example 14
Component B
Urethane-containing polyisocyanate mixture, prepared as described in Example 10.
To prepare the PU foam,
100 parts by weight of component A and
59.36 parts by weight of component B
were mixed thoroughly by stirring at 23° C., and 250 g of the reaction mixture were introduced into the mold and allowed to expand and cure therein.
The following foam data were measured for expansion in an open plastic cup:
initiation time: 31 seconds
setting time: 76 seconds
rise times: 119 seconds.

| Constituents of the composite element | Storage at 120° C. [hours] | Tear strength [N/mm$^2$] | Elongation at break [%] |
|---|---|---|---|
| Film made from a PVC/ABS polymer mixture, dyed gray | 0 | 15.30 | 171.92 |
| | 300 | 18.15 | 178.10 |
| | 500 | 16.74 | 96.40 |
| PU foam | 0 | 0.26 | 50.48 |
| | 300 | 0.15 | 37.16 |
| | 500 | 0.14 | 31.36 |

EXAMPLE 25

The procedure was similar to that of Example 14.
Component A
As in Example 14
Component B
Urethane-containing polyisocyanate mixture, prepared as described in Example 11.
To prepare the PU foam,
100 parts by weight of component A and
59.10 parts by weight of component B
were mixed thoroughly by stirring at 23° C., and 250 g of the reaction mixture were introduced into the mold and allowed to expand and cure therein.
The following foam data were measured for expansion in an open plastic cup:
initiation time: 23 seconds
setting time: 56 seconds
rise time: 104 seconds.

| Constituents of the composite element | Storage at 120° C. [hours] | Tear strength [N/mm$^2$] | Elongation at break [%] |
|---|---|---|---|
| Film made from a PVC/ABS polymer mixture, dyed gray | 0 | 11.12 | 150.72 |
| | 300 | 17.31 | 180.80 |
| | 500 | 14.80 | 97.70 |
| PU foam | 0 | 0.31 | 46.16 |
| | 300 | 0.30 | 27.52 |
| | 500 | 0.23 | 24.12 |

EXAMPLE 26

The procedure was similar to that of Example 14.
Component A
As in Example 14
Component B
Urethane-containing polyisocyanate mixture, prepared as described in Example 12.
To prepare the PU foam,
100 parts by weight of component A and
59.10 parts by weight of component B
were mixed thoroughly by stirring at 23° C., and 250 g of the reaction mixture were introduced into the mold and allowed to expand and cure therein.
The following foam data were measured for expansion in an open plastic cup:
initiation time: 24 seconds
setting time: 60 seconds
rise time: 120 seconds.

| Constituents of the composite element | Storage at 120° C. [hours] | Tear strength [N/mm$^2$] | Elongation at break [%] |
|---|---|---|---|
| Film made from a PVC/ABS polymer mixture, dyed gray | 0 | 11.10 | 150.60 |
| | 300 | 16.80 | 160.00 |
| | 500 | 14.0 | 80.00 |
| PU foam | 0 | 0.28 | 40.00 |
| | 300 | 0.26 | 38.80 |
| | 500 | 0.18 | 34.30 |

EXAMPLE 27

The procedure was similar to that of Example 14.
Component A
As in Example 14
Component B
A mixture comprising 250 parts by weight of the α,β-olefinically unsaturated polyester described in Example 1 and 100 parts by weight of a glycerol-initiated polyoxypropylene (25.8% by weight)-polyoxyethylene (74.2% by weight)-polyol having a hydroxyl number of 42 was added in portions with stirring at 60° C. to 1395 parts by weight of 4,4'-diphenylmethane diisocyanate.

The reaction mixture was then stirred at 80° C. for 1 hour, cooled to 50° C. and mixed thoroughly at this temperature with 3255 parts by weight of crude MDI as in Example 1.

A urethane-containing polyisocyanate mixture having an NCO content of 27.62% by weight and a viscosity at 25° C. of 478 mPa.s was obtained.

To prepare the PU foam, 100 parts by weight of component A and 59.03 parts by weight of component B were mixed thoroughly by stirring at 23° C., and 250 g of the reaction mixture were introduced into the mold and allowed to expand and cure therein.

The following foam data were measured for expansion in an open plastic cup:
  initiation time: 23 seconds
  setting time: 76 seconds
  rise time: 123 seconds.

| Constituents of the composite element | Storage at 120° C. [hours] | Tear strength [N/mm²] | Elongation at break [%] |
|---|---|---|---|
| Film made from a PVC/ABS polymer mixture, dyed gray | 0 | 14.95 | 167.8 |
|  | 300 | 18.14 | 165.3 |
|  | 500 | 20.08 | 106.2 |
| PU foam | 0 | 0.33 | 57.02 |
|  | 300 | 0.32 | 31.20 |
|  | 500 | 0.28 | 28.50 |

EXAMPLE 28

40 parts by weight of dibutyl phthalate as plasticizer and 5 parts by weight of a crystalline α,β-olefinically unsaturated polyester having a hydroxyl number of 179, an acid number of 4.4, a melting point of from 80° to 85° C. (from ethanol) and a molecular weight factor per double bond of 163.7 and prepared by poly-condensing fumaric acid and ethanediol in the molar ratio 1:1.35 were introduced into 100 parts by weight of a microsuspension PVC having a K value of 80.

A film was produced from the resultant plastisol by a process similar to that described in Kunststoffhandbuch, Volume II, Part 2, pages 1078 to 1098 (edited by Dr. G. Becker and Dr. D. Braun, Carl Hahser Verlag, Munich, Vienna, 1986).

The PVC film obtained was provided with a foam backing by a method similar to that of Example 14.

The following mechanical properties were measured for the composite element obtained:

| Constituents of the composite element | Storage at 120° C. [hours] | Tear strength [N/mm²] | Elongation at break [%] |
|---|---|---|---|
| Film as in Example 28 | 0 | 12.62 | 252.88 |
|  | 300 | 14.68 | 210.57 |
|  | 500 | 13.10 | 207.20 |
| PU foam | 0 | 0.29 | 48.30 |
|  | 300 | 0.28 | 28.30 |
|  | 500 | 0.24 | 39.44 |

We claim:

1. A composite element consisting essentially of
   A) at least one top layer of polyvinyl chloride or a polyvinyl chloride-containing polymer mixture, and
   B) a polyurethane foam,
wherein the polyvinyl chloride or polyvinyl chloride-containing polymer mixture of the top layer (A), the polyurethane foam (B), or (A) and (B) contain units of an α,β-olefinically unsaturated polyester having a molecular weight factor per double bond of from 150 to 3000.

2. A composite element as claimed in claim 1, wherein the α,β-olefinically unsaturated polyester having a molecular weight factor per double bond of from 150 to 3000 additionally has
   a functionality of from 2 to 6,
   a hydroxyl number of from 20 to 800 and
   an acid number of from 0 to 15.

3. A composite element as claimed in claim 1, wherein the polyvinyl chloride or polyvinyl chloride-containing polymer mixture of the top layer (A), the polyurethane foam (B), or (A) and (B) contains units of an α,β-olefinically unsaturated polyester having a molecular weight factor per double bond of from 150 to 3000 in an amount of from 1 to 30% by weight, based on the weight of (A) or (B).

4. A composite element as claimed in claim 1, wherein the top layer (A) of polyvinyl chloride or a polyvinyl chloride-containing polymer mixture contains an incorporated α,β-olefinically unsaturated polyester which softens at above 30° C. or is pasty in an amount of from 5 to 30% by weight, based on the weight of (A).

5. A composite element as claimed in claim 1, wherein the polyurethane foam (B) is prepared using an α,β-olefinically unsaturated polyester which is liquid at 23° C. and by bonding the latter in the polyurethane foam.

6. A composite element as claimed in claim 1, wherein the polyurethane foam (B) is semirigid or rigid.

7. A composite element consisting essentially of
   A) at least one top layer of polyvinyl chloride or a polyvinyl chloride-containing polymer mixture, and
   B) a polyurethane foam,
wherein the polyurethane foam (B) is prepared by reacting
   a) a urethane-containing, diphenylmethane diisocyanate-based polyisocyanate mixture containing from 15 to 32% by weight of NCO groups, this mixture itself being obtainable by reacting a diphenylmethane diisocyanate isomer or a mixture of diphenylmethane diisocyanate isomers and a polyphenyl-polymethylene polyisocyanate with at least one α,β-olefinically unsaturated polyester having a molecular weight factor per double bond of from 150 to 3000, a functionality of from 2 to 6, a hydroxyl number of from 20 to 800 and an acid number of from 0 to 15, or a mixture of said α,β-olefinically unsaturated polyester and a polyoxyalkylenepolyol having a functionality of from 2 to 4 and a hydroxyl number of from 20 to 400, with
   b) at least one relatively high-molecular-weight polyhydroxyl compound containing at least two reactive hydrogen atoms and
   c) if desired chain extenders and/or crosslinking agents, in the presence of d) a blowing agent,
e) a catalyst and, if desired,
f) assistants and/or additives.
8. A composite element as claimed in claim 7, wherein the polyurethane foam (B) is prepared in the absence of compounds containing tertiary amino groups.

* * * * *